United States Patent [19]

Sells et al.

[11] Patent Number: 5,471,522
[45] Date of Patent: Nov. 28, 1995

[54] TELEPHONE LINE SHARING FOR A PERSONAL COMPUTER SYSTEM

[75] Inventors: Chris Sells, Hillsboro; Russ Hampsten, Beaverton, both of Oreg.

[73] Assignee: Intel Corporation, Santa Clara, Calif.

[21] Appl. No.: 101,908

[22] Filed: Aug. 4, 1993

[51] Int. Cl.[6] .................................................. H04M 11/00
[52] U.S. Cl. ................ 379/97; 379/98; 379/100
[58] Field of Search .................. 379/97, 98, 96, 379/95, 94, 100, 102, 104, 105, 142, 210, 211, 212, 214, 93, 372, 373, 88, 89

[56] References Cited

U.S. PATENT DOCUMENTS

| | | | |
|---|---|---|---|
| 4,674,115 | 6/1987 | Kaleita et al. | 379/102 |
| 4,908,851 | 3/1990 | Kotani et al. | 379/100 |
| 4,953,199 | 8/1990 | Hoshi et al. | 379/102 |
| 4,974,253 | 11/1990 | Hashimoto | 379/102 |
| 4,998,273 | 3/1991 | Nichols | 379/102 |
| 5,054,055 | 10/1991 | Hanle et al. | 379/96 |
| 5,062,133 | 10/1991 | Melrose | 379/102 |
| 5,065,427 | 11/1991 | Godbole | 379/100 |
| 5,109,405 | 4/1992 | Morganstein | 379/142 |
| 5,192,999 | 3/1993 | Graczyk et al. | 379/100 |
| 5,361,296 | 11/1994 | Reyes et al. | 379/102 |

*Primary Examiner*—Curtis Kuntz
*Assistant Examiner*—Stella L. Woo
*Attorney, Agent, or Firm*—Blakely, Sokoloff, Taylor & Zafman

[57] ABSTRACT

A method and apparatus for processing an incoming call over a telephone line in a computer system, wherein a telephone manager program passes the telephone line to a telephony application program according to at least one user option, a set of user preferences, and DTMF or calling tones.

32 Claims, 9 Drawing Sheets

TELEPHONE LINE SHARING FOR A PERSONAL COMPUTER SYSTEM

BACKGROUND OF THE INVENTION

1. Field of the Invention

The present invention pertains to the field of personal computer systems. More particularly, this invention relates to a personal computer system wherein telephone line shares voice, data modem, and fax calls.

2. Art Background

Non dedicated telephone lines are often employed in small office or home office environments to provide voice, modem, and fax communication for a personal computer. The personal computer typically employs one non dedicated telephone line to receive modem and fax calls as well as voice calls. Such telephone line sharing enables modem and fax communication while avoiding the cost of providing separate modem telephone lines and fax telephone lines in the small business or home office.

In such small business or home office environments, a telephony subsystem of the personal computer typically performs the telephone line interface functions required for modem, fax and voice communication. The telephone line interface functions include line seizure and ring detect, as well as audio and digital signal processing functions.

Typically, application programs executing on the personal computer perform the higher level modem, fax and voice communication functions as well as user interface functions. For example, a fax application program on the personal computer controls fax transfers over the shared telephone line through a driver program for the telephony subsystem.

In a typical small business or home office telephone line topology, the telephony subsystem is coupled to an incoming telephone line or a private branch exchange (PBX) line. One or more extension telephones and a telephone answering machine are typically coupled to the incoming telephone line in parallel with the telephony subsystem. The telephony subsystem usually drives one or more serial telephones over a local line.

Typically in such systems, the telephony subsystem initially determines whether an incoming call is a fax call by sensing a fax calling tone while transmitting a ringback tone over the telephone line. If the fax calling tone is detected, then the telephony subsystem picks up the telephone line and transmits a fax response tone over the telephone line. Thereafter, the fax application program performs a fax data transfer through the telephony subsystem.

If the telephony subsystem does not detect the fax calling tone with the incoming call, then the incoming call is typically assumed to be a voice call. The telephony subsystem couples the incoming line to the local line and rings the serial telephone to enable a user to receive the voice call.

Unfortunately, such prior telephony subsystems cannot properly process incoming calls from a data modem and manual fax. Such devices call and wait for a response tone rather than transmit a calling tone. As a consequence, the telephony subsystem in such a prior system usually assumes that an incoming call from a data modem or manual fax is a voice call and rings the serial telephone. The user picking up the serial telephone perceives silence on the telephone line because the data modem or the manual fax is waiting for a response tone.

Moreover, such telephony subsystems ring only the serial telephones coupled to the local line. As a consequence, the parallel telephones coupled to the incoming telephone line do not achieve full utility.

SUMMARY AND OBJECTS OF THE INVENTION

One object of the present invention is to enable a telephone line coupled to a personal computer to share the telephone line for voice calls, data modem calls and fax calls.

Another object of the present invention is to share a telephone line coupled to a personal computer for voice calls, data modem calls and fax calls and to enable ringing of parallel extensions on the telephone line during incoming calls.

Another object of the present invention is to direct an incoming call to an appropriate telephony application program on the personal computer according to fax and data modem calling tones.

A further object of the present invention is to direct an incoming call to an appropriate telephony application program on the personal computer according to data code and modem code DTMF tones entered by a user at a parallel extension on the telephone line.

Another object of the present invention is to direct an incoming call to an appropriate telephony application program on the personal computer according to a set of predefined user preferences.

Another object of the present invention is to direct an incoming call to an appropriate telephony application program on the personal computer according to a user option selected through a user interface.

These and other objects of the invention are provided by a method for processing an incoming call over a telephone line in a computer system. A telephone manager program opens a communication path for the telephone line through a telephony application interface and senses a ring for the incoming call over the telephone line. If a media mode for the incoming call is known, then the telephone manager program answers the incoming call and passes the telephone line to a telephony application program for the media mode. If the media mode for the incoming call is not known, then the telephone manager program notifies a user that the incoming call is received and determines at least one user option through a user interface. If the media mode for the incoming call is not known, then the telephone manager program determines whether a ring stop has occurred on the telephone line.

If the ring stop has occurred due to a parallel telephone pick-up, then the telephone manager program senses at least one control tone on the telephone line and passes the telephone line to the telephony application program according to the control tone and a set of user preferences. If the ring stop has occurred due to a serial telephone pick-up, then the telephone manager program passes the telephone line to the telephony application program according to the user option. If the ring stop has not occurred, then the telephone manager program determines whether a minimum number of rings has occurred, wherein the minimum number of rings is predefined by the user preferences.

If the minimum number of rings has occurred, then the telephone manager program passes the telephone line to the telephony application program according to the user preferences. If the minimum number of rings has not occurred, then the telephone manager program senses another ring or the ring stop on the telephone line, or receives a media mode message from the telephony application interface that specifies the media mode for the incoming call.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
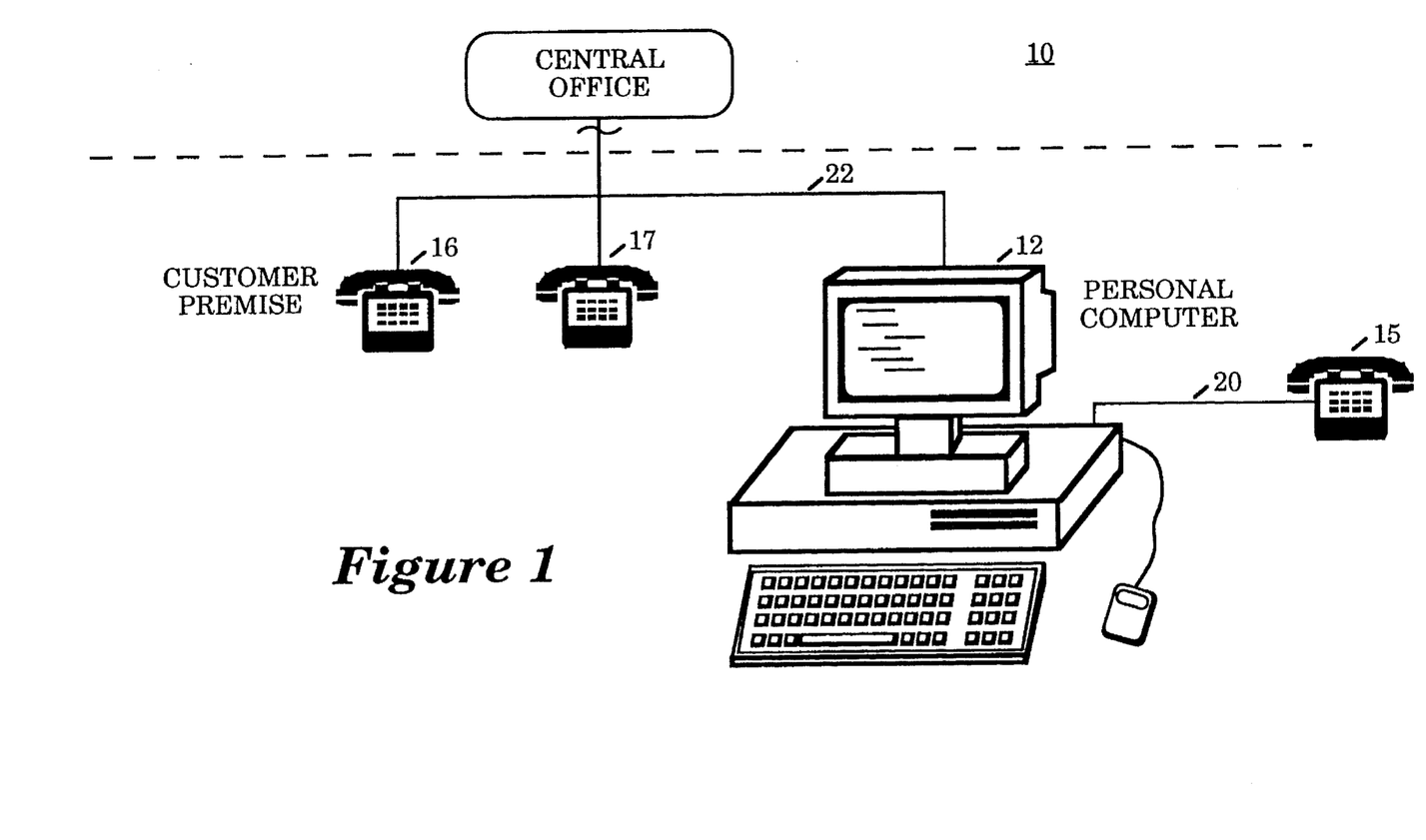
FIG. 1 is an illustration of a small business or home office telephone system for one embodiment which includes a personal computer that receives incoming calls and transmits outgoing calls over a telephone line.

FIG. 1 illustrates a small business or home office telephone system 10 for one embodiment. The telephone system 10 includes a personal computer 12 that receives incoming calls and transmits outgoing calls over a telephone line 22. The telephone line 22 comprises a standard telephone line or alternatively a private branch exchange (PBX) line.

A pair of telephones 16 and 17, along with a telephone answering machine 18 are coupled to the telephone line 22 in parallel with the personal computer 12. A serial telephone 15 is coupled to the personal computer 12 over a local line 20.

Figure 2:
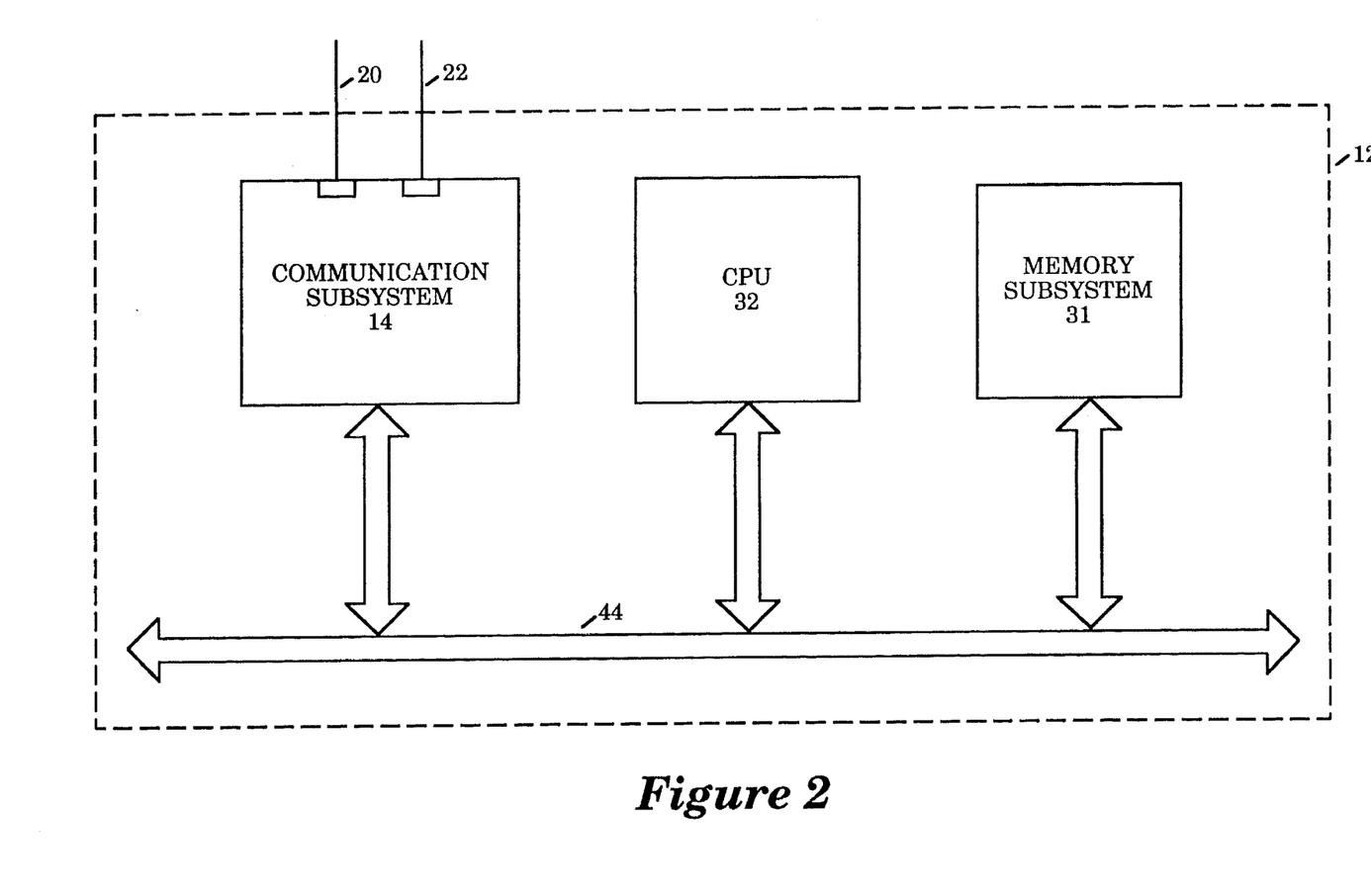
FIG. 2 is an illustration of a personal computer which comprises a central processing unit, a memory subsystem, and a telephony subsystem which communicate over a host bus.

FIG. 2 illustrates the personal computer 12. The personal computer 12 comprises a central processing unit (CPU) 32, a memory subsystem 31, and a telephony subsystem 14. The CPU 32, the memory subsystem 31, and the telephony subsystem 14 communicate over a host bus 44. The telephony subsystem 14 receives incoming calls and transmits outgoing calls over a telephone line 22.

Figure 3:
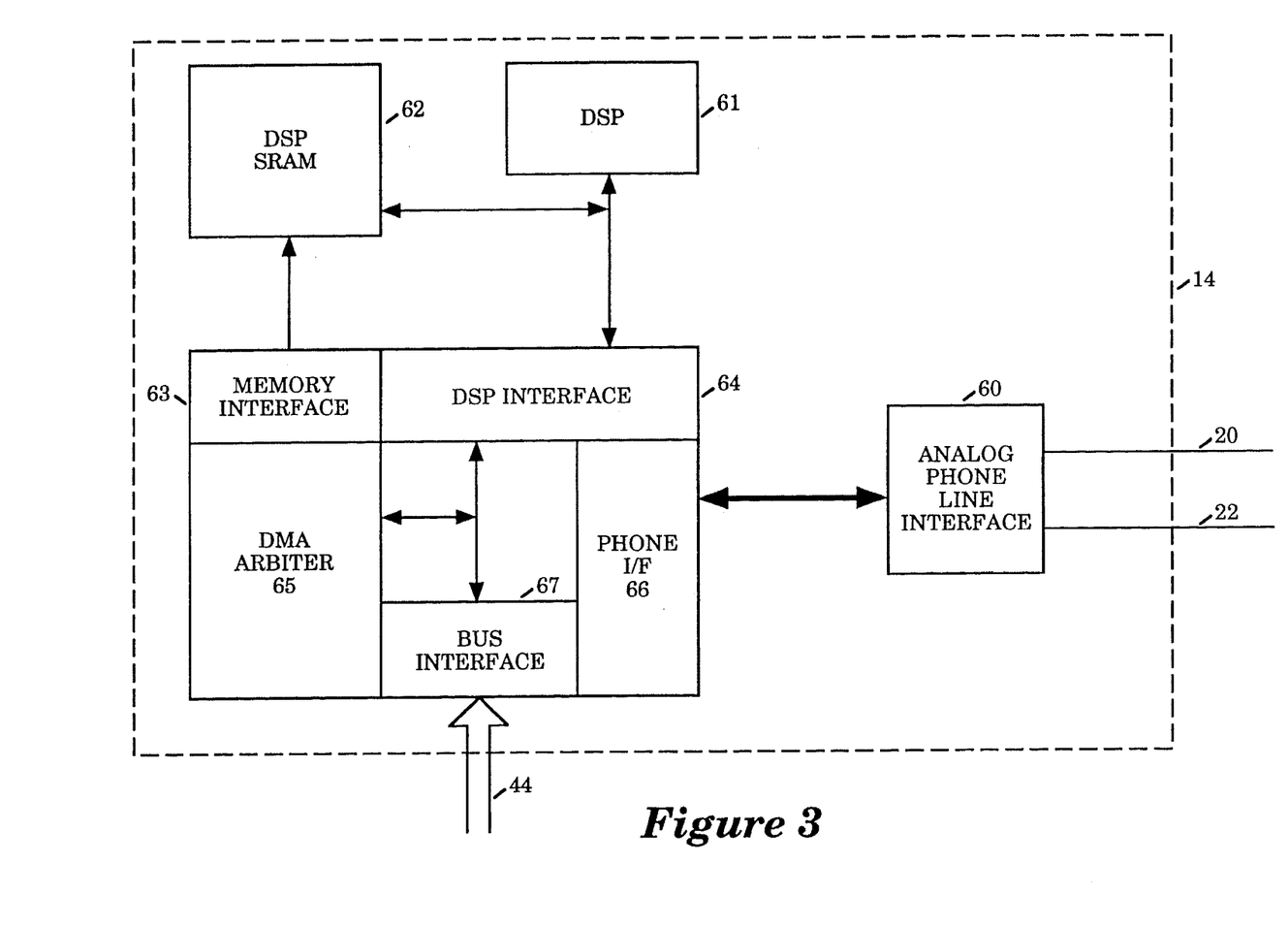
FIG. 3 is a diagram illustrating the telephony subsystem which comprises an analog phone line interface circuit, a digital signal processor (DSP), and a set of interface circuits.

FIG. 3 is a diagram illustrating the telephony subsystem 14. The telephony subsystem 14 comprises an analog phone line interface circuit 60, a digital signal processor (DSP) 61, and a set of interface circuits 63–67.

A DSP static random access memory (SRAM) 62 functions as a control store for the DSP 61. The bus interface circuit 67 and the DMA arbiter circuit 65 enable the DSP 61 to communicate over the host bus 44.

The analog phone line interface circuit 60 enables transfer of incoming and outgoing calls over the local line 20 and the telephone line 22. The analog phone line interface circuit 60 transfers digital data to and from the DSP 61 through the phone interface circuit 66.

Figure 4:
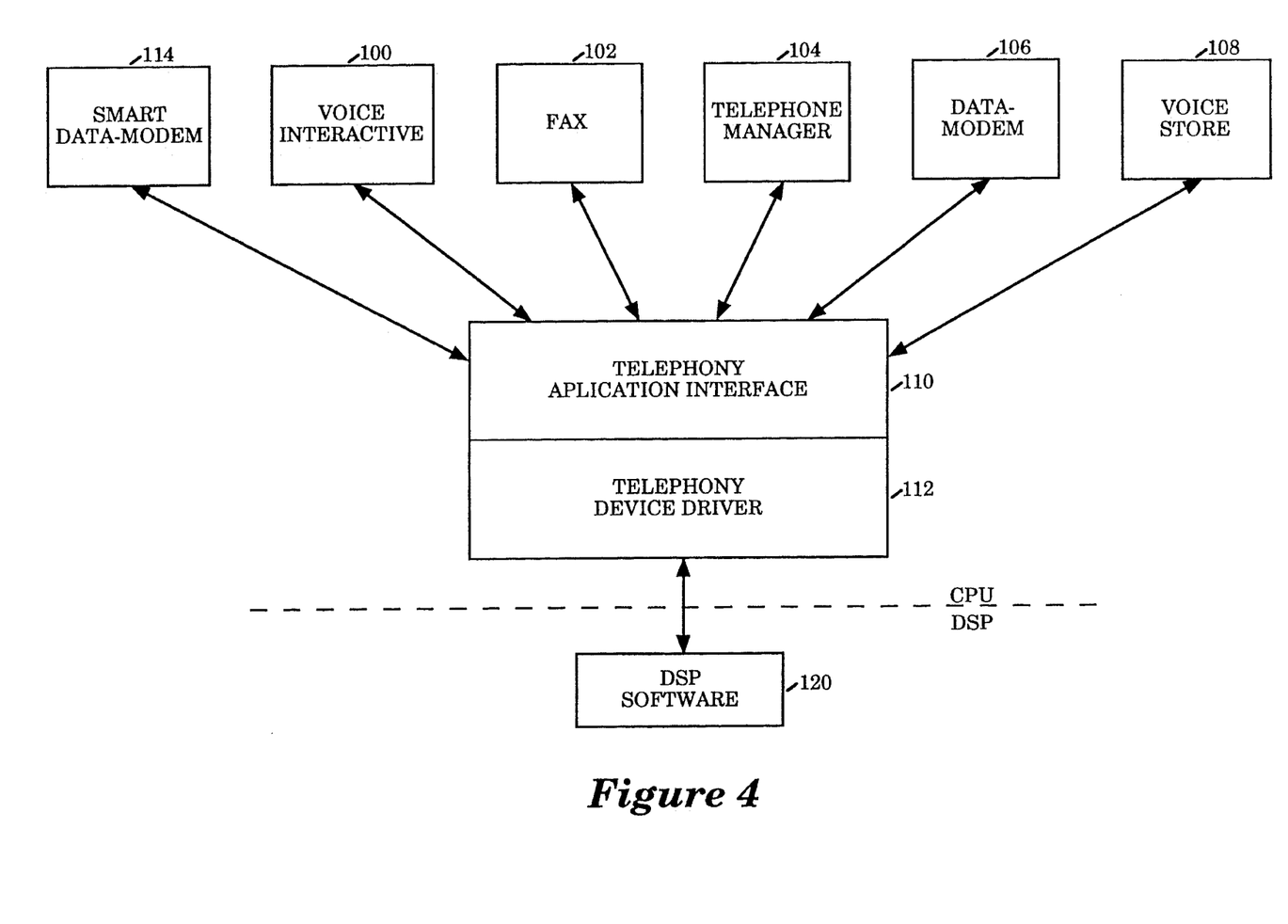
FIG. 4 is a diagram illustrating the architecture of telephony software implemented on the personal computer for one embodiment, wherein the telephony software elements comprise a telephone manager program and a set of telephony application programs.

FIG. 4 illustrates the architecture of telephony software implemented on the personal computer 12 for one embodiment. The telephony software elements comprise a telephone manager program 104 and a set of telephony application programs. The telephony application programs comprise a smart data modem application program 114, a voice interactive application program 100, a fax application program 102, a data modem application program 106 and a voice store application program 108.

The telephone manager program 104 senses incoming calls on the telephone line 22 through the telephony subsystem 14. The telephone manager program 104 determines a media mode for each call and directs the call to the appropriate telephony application program. The media modes for incoming calls include a voice media mode, a data modem media mode, and fax media mode.

The voice interactive application program 100 enables a user to communicate over the telephone line 22 through the telephony subsystem 14 with a microphone or headset connected to the personal computer 12.

The fax application program 102 enables transfer of fax information over the telephone line 22 through the telephony subsystem 14.

The data modem application program 106 enables transfer of data modem information over the telephone line 22 through the telephony subsystem 14.

The voice store application program 108 enables transfer of voice information over the telephone line 22 through the telephony subsystem 14. The voice store application program 108 also enables the personal computer 12 to function as an automatic telephone answering machine.

The smart data modem application program 114 enables transfer of data modem information and fax information over the telephone line 22 through the telephony subsystem 14.

DSP software 120 executed by the DSP 61 controls the incoming and outgoing calls over the telephone line 22 and controls the serial telephone 15 over the local line 20.

A telephony device driver 112 for the telephony subsystem 14 enables the telephony application programs to access the telephony functions of the telephony subsystem 14.

A telephony application interface 110 is a standardized interface for telephony applications implemented on the personal computer 12. The telephony application interface 110 enables telephony application programs to access the telephony subsystem 14 through telephony device driver 112. For one embodiment, the telephony application interface 110 comprises the windows telephony application programming interface for Microsoft Windows (Windows Telephony API).

When an incoming call is received over the telephone line 22, the telephone manager program 104 waits for a user to pick up one of the parallel extensions (the telephones 16–17)

or the serial telephone 15. Thereafter, the telephone manager program 104 causes the telephony subsystem 14 to sense tones on the telephone line 22 to determine whether the incoming call is a fax or modem media mode.

A user answering a fax or modem media mode call on one of the parallel telephones 16 or 17 will realize that the incoming call is not a voice call. The user enters a data code DTMF on the keypad of the parallel telephone 16 or 17 to cause the telephone manager program 104 to direct the incoming call as a mode or fax media mode call. The user then hangs up. If the user picked up the serial telephone 15, the data code DTMF and hang up is optional because the telephony subsystem 14 controls serial telephone 15 and performs the hang up.

If one of the parallel telephones 16–17 is not picked up after a predetermined number of rings, the telephone manager program 104 may initiate an answering machine function by passing the incoming call to the voice store application program 108. The predetermined number of rings is configurable through a user preference. If the incoming call is a fax or modem media mode call, the voice store application program 108 aborts the answering machine function.

If one of the parallel telephones 16–17 is picked up and the telephony subsystem 14 does not detect a modem of fax media mode, then the telephone manager program 104 bypasses the incoming call. If an incoming call is not picked up by one of the parallel telephones 16–17 and the answering machine function is not enabled by the user preferences, then the telephone manager program 104 bypasses the incoming call.

The telephone manager program 104 bypasses an incoming call by causing the telephony subsystem 14 to transfer the incoming call signals to the serial telephone 15. The bypass function enables one of the parallel telephones 16–17 to pick up the incoming call and establish a voice conversation while allowing the serial telephone 15 to join the conversation.

When an incoming call is received over the telephone line 22, the serial telephone 15 rings along with the parallel telephones 16–17. The serial telephone 15 rings even if a distinctive ring is detected. The telephone manager program 104 passes the incoming call off to the telephony application having the highest priority for processing the media mode of the incoming call.

If the appropriate telephony application program for the incoming media mode is not running, and if the serial telephone 15 has not been picked up, then the incoming call is disconnected after being picked by the telephony subsystem 14. If the incoming call was not picked up by the telephony subsystem 14 or if the serial telephone 15 has picked up, then the telephone manager program 104 causes the telephony subsystem 14 to bypass and ignore the incoming call.

The user of the personal computer 12 selects a set of user preferences for the telephone manager program 104 that specify the handling of voice calls, fax calls or data modem calls received over the telephone line 22.

The user preferences for modem calls include a user preference for handling the incoming modem calls actively or passively, and a user preference to ignore incoming modem calls. If the user preferences specify active handling of modem calls, then the telephone manager program 104 causes the telephony subsystem 14 to attempts modem communication immediately after answering an incoming call. If the user preferences specify passive handling of modem calls, then the telephone manager program 104 causes the telephony subsystem 14 to listens for a modem calling tone on the telephone line 22 after answering an incoming call.

If the user preferences specify the option to ignore incoming modem calls, then the incoming call is dropped when a data modem CNG tone is detected.

The user preferences specify a set of DTMF codes including a data code DTMF and a modem code DTMF. The data code DTMF is entered by the user at one of the parallel telephones 16–17 to cause the telephone manager program 104 to direct an incoming call on the telephone line 22 as a fax or modem media mode.

A calling modem appends the modem code DTMF to the modem dial string to indicate that a modem is calling. The modem code DTMF causes the telephony application program to pass the incoming call to the data modem application program 106.

The user preferences specify whether a distinctive ring function for the telephone manager program 104 is active. The distinctive ring cadences for the distinctive ring function are configured by the user. The user preferences specify a ring cadence and a media mode for incoming calls corresponding to the ring cadence.

The telephone central office assigns more than one phone number to the telephone line 22 for the distinctive ring function. The telephone central office causes the telephones 15–17 to ring in different ring cadences according to the different phone numbers for the telephone line 22. For example, the ring cadences may comprise one long ring followed by one short ring for one phone number, and one long ring followed by two short rings for another phone number.

The distinctive ring cadence identifies one phone number for voice calls and another phone number for fax and modem calls. The telephone manager program 104 detects the ring cadence through the telephony subsystem 14 to determine the media mode for incoming calls on the telephone line 22.

The user preferences specify whether a caller ID function for the telephone manager program 104 is active. The telephone central office provides caller ID by transferring the phone number of the calling party during the silent period after the first full ring on the telephone line 22. The telephone manager program 104 uses the phone number of the calling party to determine the media mode for the incoming call if the caller ID function is active. The user preferences specify a phone number and a media mode corresponding to the phone number for the caller ID function.

The user preferences specify a minimum number of rings for an incoming call. If the user picks up the call on one of the telephones 15–17 before the minimum number of rings, the telephone manager program 104 causes the telephony subsystem 14 to listen on the telephone line 22 for fax calling tones or DTMF tones. The telephony subsystem 14 listens on the telephone line 22 for the length of the incoming call. Meanwhile, the telephone manager program 104 passes the incoming call to the voice store application program 108. The voice store application program 108 passes the incoming call to the modem or the fax application program 102 if fax calling tones or DTMF tones are detected by the telephony subsystem 14.

If the incoming call is not picked up before the minimum number of rings, the telephone manager program 104 passes the incoming call to the voice store application program 108 if an answer voice calls option is specified in the user preferences.

The voice store application program 108 passes the incoming call to the modem or the fax application program 102 if the modem or the fax media modes are detected. The voice store application program 108 passes the incoming call to the fax telephony application program if a fax calling tone is detected during the greeting. The voice store application program 108 passes the incoming call to the modem telephony application program if the data code DTMF is entered by the user. The voice store application program 108 passes the incoming call to the modem telephony application program if a long silence occurs while recording a message.

The telephone manager program 104 passes the incoming call to voice store application program 108 after the minimum number of rings if the user preferences specify the answer voice calls option. If the user preferences specify an answer fax option or an answer data modem option, then the telephone manager program 104 passes the incoming call to the modem telephony application program. The modem telephony application program then determines whether the incoming call is a fax media mode call.

The telephone manager program 104 determines that an incoming call is an automatic fax by detecting the fax transmitting tones (CNG) on the telephone line 22 through the telephony subsystem 14. An automatic fax begins to generate the CNG tones after dialing. The user may pick up one of the telephones 16–17 and hear the CNG tones. The user can properly direct the incoming call by entering of the data code DTMF and hanging up.

The telephone manager program 104 detects the data code DTMF through the telephony subsystem 14. Thereafter, the telephone manager program 104 causes the telephony subsystem 14 to transmit a "hang up now" audio message (HUNS) over the telephone line 22 to inform the user to hang up the telephone.

If the telephone manager program 104 detects fax or data modem CNG tones through the telephony subsystem 14 before the data code DTMF is entered, the telephone manager program 104 causes transmission of the HUNS message and then passes the incoming call to the modem or fax application program 102.

An incoming manual fax call is initiated by a person placing a call using a fax machine with the intention to push a button on the fax machine to cause a fax transmission (e.g., pushing a send button). After picking up a manual fax call on one of the telephones 16–17, the user may enter the data code DTMF and hang up the phone if it is determined that the caller will press the send button on a fax machine.

If the user picks up the manual fax call at the serial telephone 15 or via software on the personal computer 12, the telephone manager program 104 passes the call to a voice interactive application program 100. The voice interactive application program provides a user interface to allow the incoming call to be passed to the fax application program 102.

If the user does not answer the incoming manual fax call, then the call is passed to the voice store application program 108. The voice store application program 108 detects the fax CNG tones and passes the call to the fax application program 102.

An incoming call from a data modem does not produce calling tones on the telephone line 22. The user answering the data modem call perceives silence and then enters the data code DTMF to cause the telephone manager program 104 to direct the incoming call as the data modem media mode.

If the user does not answer the incoming data modem call, then the telephone manager program 104 passes the call to the voice store application program 108 if the answer voice calls user preference is selected. The voice store application program 108 defines a method used by the calling party to indicate an incoming data modem call. For example, the voice store application program 108 may sense DTMF tones through the telephony subsystem 14 that indicate an incoming data modem call. After the calling party indicates a data modem call via the predefined method, the voice store application program 108 passes the call to the modem telephony application program.

If the user does not answer the incoming data modem call, and if the answer voice calls user preference is not selected, and if the process modem calls user preference is selected, then the call is passed to the data modem application program 106. If the process modem calls user preference is not selected, then the call is ignored.

Figure 5:
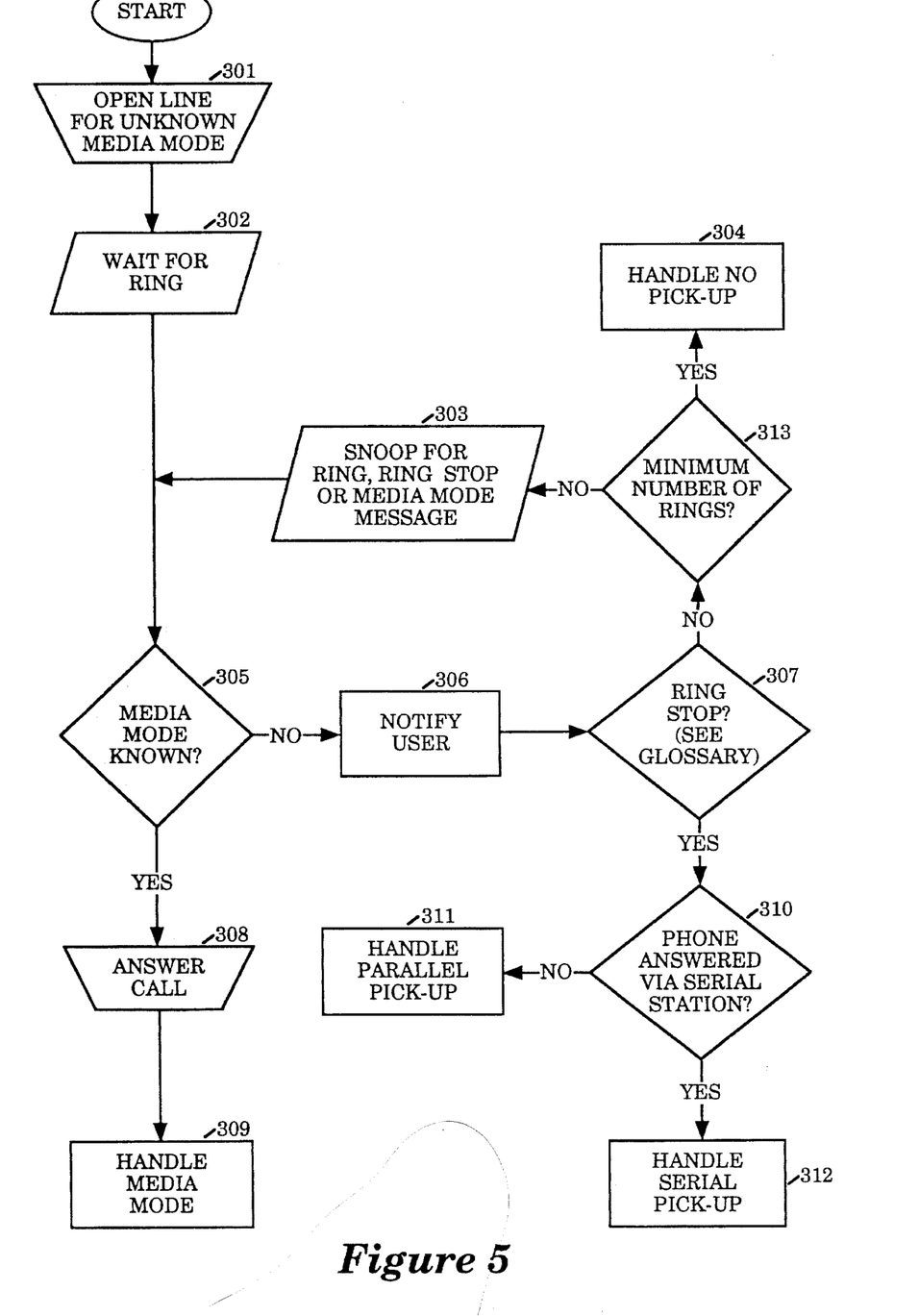
FIG. 5 is a diagram illustrating a process employed by the telephone manager program to process an incoming call.

FIG. 5 illustrates a process employed by the telephone manager program 104 to process an incoming call over the telephone line 22. At block 301 the telephone manager program 104 opens the telephone line 22 for an unknown media mode through the telephony application interface 110.

The open telephone line for unknown media mode causes the telephony application interface 110 to notify the telephone manager program 104 of any activity on the telephone line 22 that has an unknown media mode. The open telephone line also causes the telephony application interface 110 to transfer telephonic information received the telephone line 22 up to the telephone manager program 104.

At block 302, the telephone manager program 104 waits for a ring on the telephone line 22. When the telephony subsystem 14 detects a ring voltage on the telephone line 22, the DSP software 120 transfers a ring message up to the telephony device driver 112. The telephony application interface 110 steers the ring message up to the telephone manager program 104.

At decision block 305, the telephone manager program 104 determines whether a media mode for the incoming call is known. A media mode for the incoming call is known if the telephony subsystem 14 has transferred a media mode message up to the telephone manager program 104. The telephony subsystem 14 determines the media mode by detecting fax calling tones or modem calling tones over the telephone line 22. The telephony subsystem 14 also detects caller ID information as well as dual tone multi-frequency (DTMF) tones and correspondingly generates media mode messages.

The telephony subsystem 14 also detects distinctive rings on the telephone line 22 to determine the media mode. A distinctive ring cadence determines whether the incoming call is a fax call, a modem call, or a voice call. In addition, if the caller ID is known to be a fax or a modem or a voice source, then the telephony subsystem 14 employs such information to generate the appropriate media mode messages.

If the media mode is known at decision block 305 then control proceeds to block 308 to answer the incoming call. At block 309 the specified media mode call is processed. The telephone manager program 104 causes the telephony application interface 110 to transfer control of the telephone line 22 to the appropriate telephony application program. For example, if the known media mode is fax, then the telephone manager program 104 causes the telephony application interface 110 to transfer control of the telephone line 22 to the fax application program 102.

If the media mode is not known at decision block 305, then control transfers to block 306 to notify the user that an incoming call is being received for an unknown media mode. At block 306 a user interface is provided on the personal computer 12 to present the user with a set of options for handling the incoming call. The user can optionally direct the incoming call to the answering machine function of the voice store application program 108. The user can optionally answer the call through headphones (not shown) attached to the personal computer 12. The user can also optionally forward the call or ignore the call.

At decision block 307, the telephone manager program 104 determines whether a ring stop has occurred on the telephone line 22. A ring stop occurs when either one of the parallel telephones 16 or 17 or the serial telephone 15 goes to an off hook state.

The off hook state of the serial telephone 15 is detected by a relay (not shown) on the telephony subsystem 14 coupled to the local line 20. A ring stop for one of the parallel telephones 16 or 17 is determined by a time out between rings on the telephone line 22, or by detection of speech energy on the telephone line 22. In addition, if the telephony subsystem 14 detects DTMF tones, fax calling tones, data modem calling tones, or other energy not appropriate between silence intervals of ring cycles on the telephone line 22 then a ring stop has occurred. The DSP software 120 transfers a ring stop message up through the telephony device driver 112 through the telephony application interface 110 to the telephone manager program 104.

If a ring stop has occurred at decision block 307, then control proceeds to decision block 310. At decision block 310, if a pick up of the serial phone 15 caused the ring stop, then control proceeds to block 312 to process the pick-up of the serial telephone 15. At decision block 310, if the serial telephone 15 is not picked up, then control is transferred to block 311 to process a pick-up of one of the parallel telephones 16 or 17.

If a ring stop has not occurred at decision block 307, then control proceeds to decision block 313 to determine whether the minimum number of rings have occurred. The minimum number of rings is a user preference for the telephone manager program 104. If the minimum number of rings has occurred at decision block 313, then control proceeds to block 304 to process the no pick-up condition.

If the minimum number of rings has not occurred at decision block 313, then control proceeds to block 303. At block 303, the telephone manager program 104 waits for either another ring on the telephone line 22, a ring stop condition, or for a media mode message from the telephony subsystem 14 that specifies the media mode for the incoming call. Thereafter, control proceeds back to decision block 305.

Figure 6:
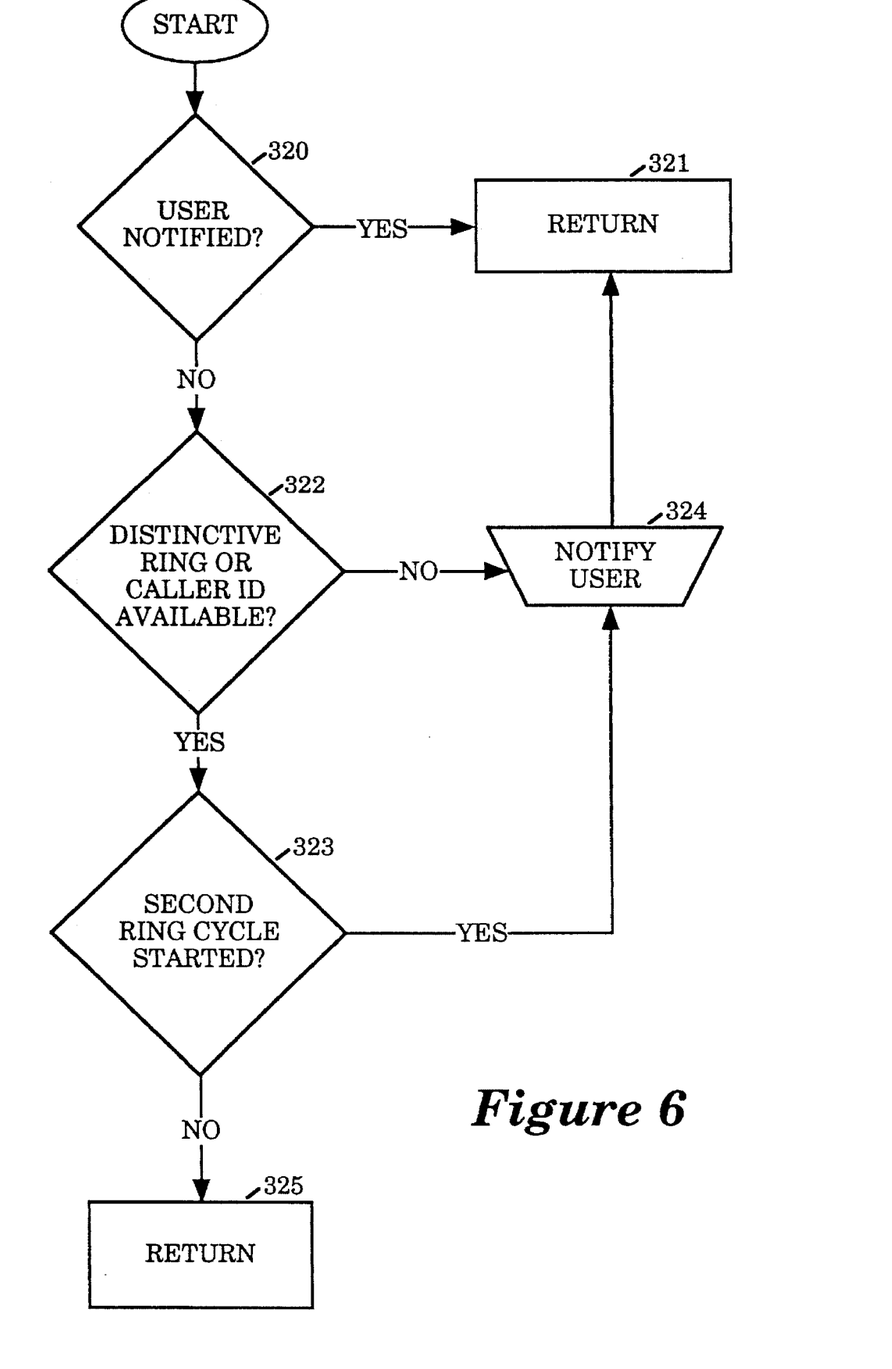
FIG. 6 is a diagram which illustrates the process of notifying the user that a call of unknown media mode is being received over the telephone line.

FIG. 6 illustrates the process of block 306 to notify the user that a call of unknown media mode is being received over the telephone line 22. At decision block 320, if the user has not already been notified, control proceeds to decision block 322.

At decision block 322, the telephone manager program 104 determines whether distinctive ring or caller ID information is available for the incoming call. If distinctive ring or caller ID information is not available, then control proceeds to block 324.

At block 324 the telephone manager program 104 notifies the user through the user interface that a call of unknown media mode is being received over the telephone line 22. The user is only notified of incoming voice calls because the telephone manager program 104 handles of fax or data modem calls automatically.

If a distinctive ring or caller ID information is available at decision block 322, then control proceeds to decision block 323 to determine whether a second ring cycle has started on the telephone line 22 for the incoming call. The second ring cycle is determined because at least one full ring cycle is needed by the telephony subsystem 14 to detect the distinctive ring or caller ID information.

At decision block 323, if the second ring cycle has started, then control proceeds to block 324 to notify the user of the incoming call of unknown media mode. If a second ring cycle has started and no distinctive ring or caller ID information is available, then such information is not forthcoming and the user is notified of the incoming call.

Figure 7:
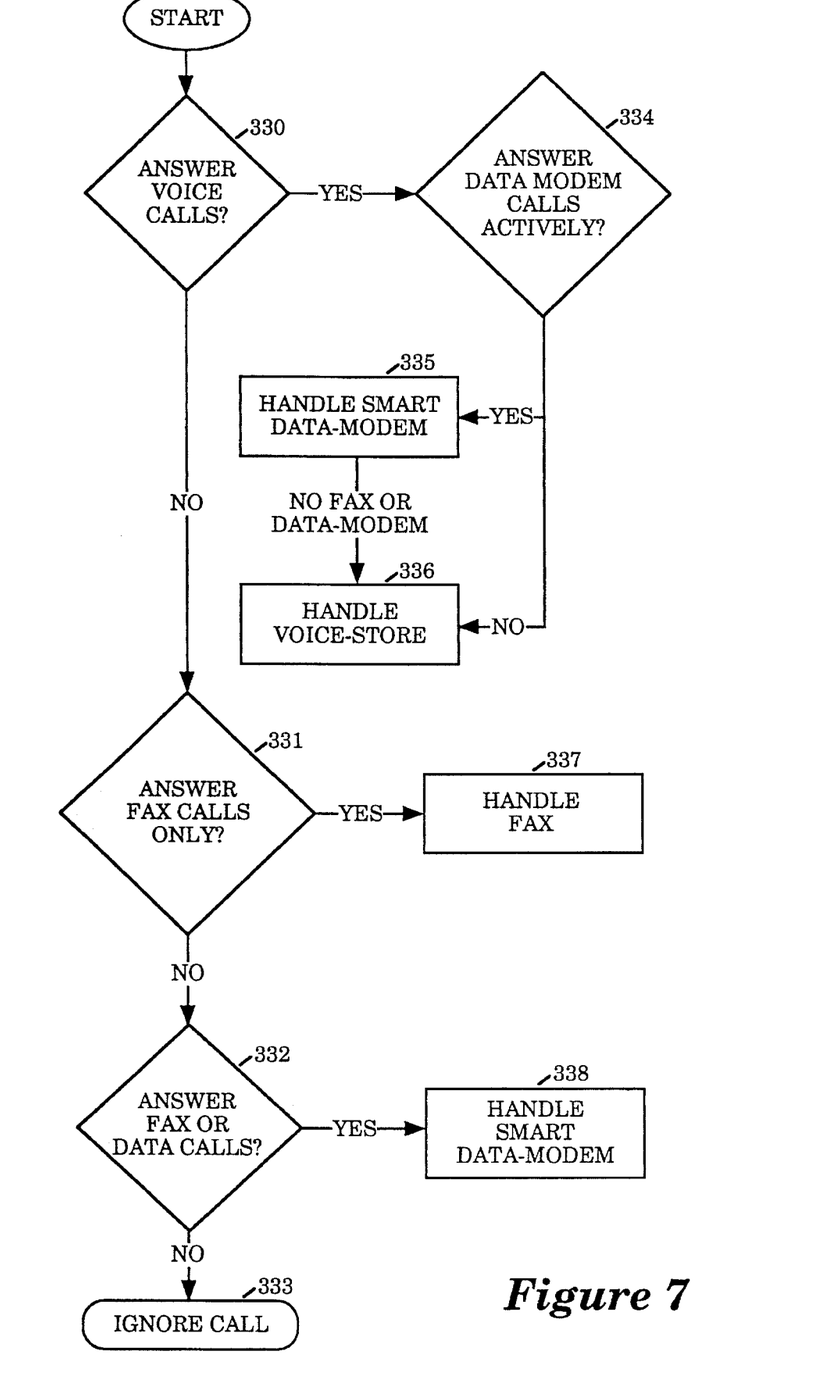
FIG. 7 is a diagram illustrating the process of handling a no pick-up condition for the incoming call.

FIG. 7 illustrates the process of block 304 for handling a no pick-up condition for the incoming call. At decision block 330 the telephone manager program 104 determines whether the option to answer voice calls is specified by the user preferences. If the answer voice calls option is selected, then control proceeds to decision block 334.

At decision block 334, if the option to answer data modem calls actively is specified by the user preferences, then control proceeds to block 335. At block 335, the telephone manager program 104 transfers control of the incoming call to the smart data modem application program 114 through the telephony application interface 110.

The smart data modem application program 114 attempts to process the incoming call as a data modem. If the data modem attempt fails, then the smart data modem application program 114 attempts to process the incoming call as a fax application. If the fax attempt fails, then the smart data modem application program 114 causes the telephony application interface 110 to transfer control of the incoming call to the voice store application program 108 at block 336.

At decision block 334, if the option to answer data modem calls actively is not specified by the user preferences, then control proceeds to block 336.

At block 336, the telephone manager program 104 causes the telephony application interface 110 to transfer control of the incoming on the telephone line 22 to the voice store application program 108. The voice store application program 108 processes media mode messages from the DSP software 120 through the telephony application interface 110. If a media mode message from the DSP software 120 specifies either a fax or a data modem incoming call, the voice store application program 108 redirects the incoming call to the appropriate application, either the fax application program 102 or the data modem application program 106.

If the user preferences do not specify the answer voice calls option at decision block 330, then control proceeds to decision block 331. At decision block 331, if the user preferences specify the answer fax calls only option, then control proceeds to block 337.

At block 337, the telephone manager program 104 causes the telephony application interface 110 to transfer control of the incoming call to the fax application program 102 to process an incoming fax call.

If the user preferences do not specify the answer fax calls only option at decision block 331, then control proceeds to decision block 332. At decision block 332, if the user preferences specify the answer fax or data calls option, then control proceeds to block 338.

At block 338, the telephone manager program 104 causes the telephony application interface 110 to transfer control of the incoming call to the data modem application program 106 to process an incoming data modem call.

If the user preferences do not specify the answer fax or data calls option at decision block 332, then control proceeds to block 333 to ignore the incoming call.

Figure 8:
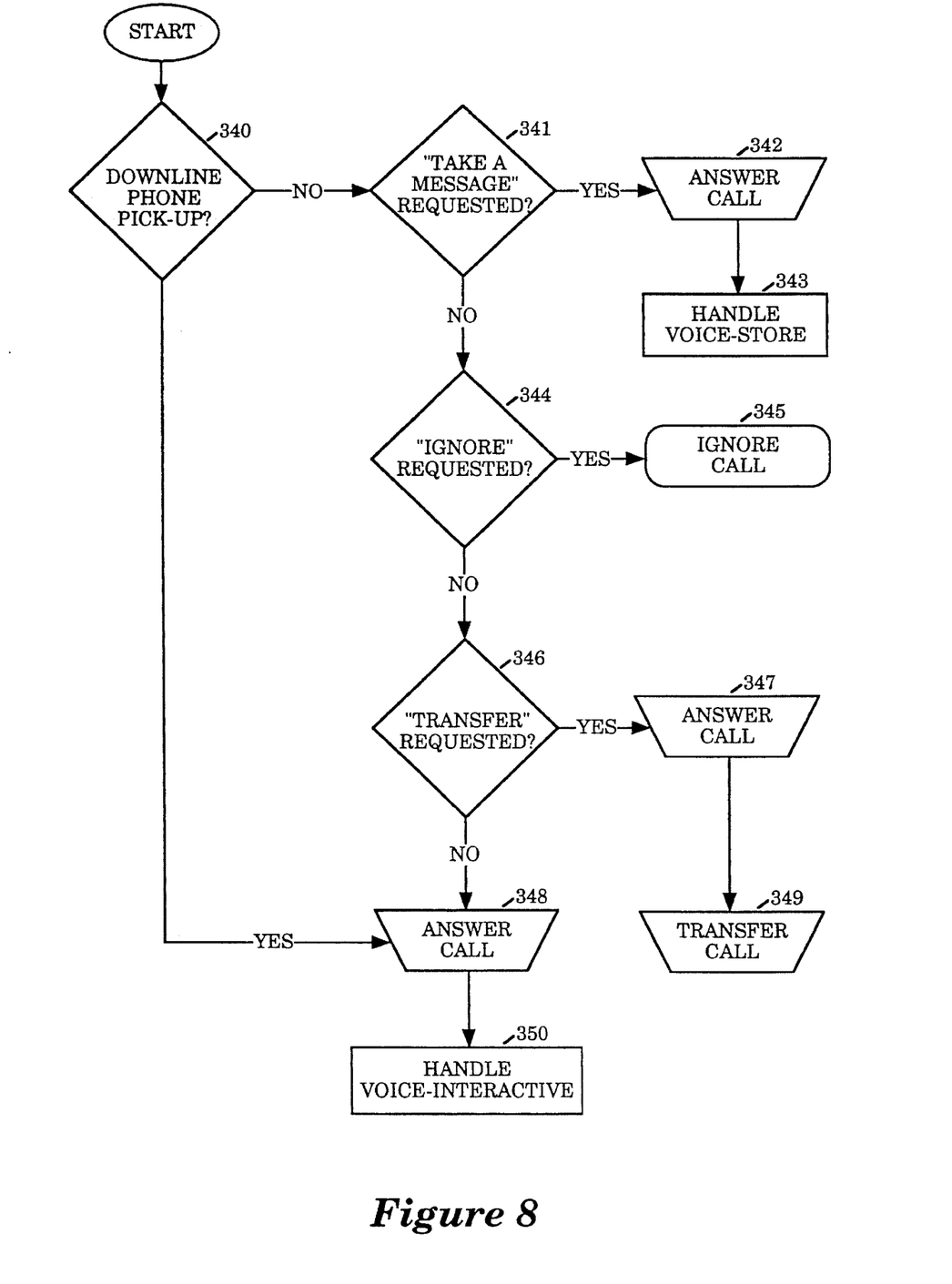
FIG. 8 is a diagram illustrating the process of the telephone manager program for handling a pick-up of the serial telephone.

FIG. 8 illustrates the process of the telephone manager program 104 for handling a pick-up of the serial telephone 15 at block 312. At decision block 340, the telephone manager program 104 determines whether a pick up has occurred on the serial telephone 15. If the telephone manager program 104 determines that the serial telephone 15 is picked up at decision block 340, then control proceeds to block 348 to answer the incoming call.

At block 348, the telephone manager program 104 causes the telephony subsystem 14 to answer the incoming call on the telephone line 22. The telephone manager program 104 transfers a message to the telephony application interface 110 which causes the telephony device driver 112 to signal the DSP software 120 to answer the incoming call. Thereafter at block 350, the telephone manager program 104 causes the telephony application interface 110 to transfer control of the incoming call to the voice interactive application program 100.

If a pick-up is not detected at decision block 340, then control proceeds to decision block 341. At decision block 341, if a take a message option has been selected through the user interface of the telephone manager program 104, then control proceeds to block 342 to answer the incoming call. Thereafter at block 343, the telephone manager program 104 causes the telephony application interface 110 to transfer control of the incoming call to the voice store application program 108 to perform the answering machine function.

If the take a message option has not been selected by the user at decision block 341, then control proceeds to decision block 344. At decision block 344, if the ignore option has been selected by the user through the user interface of the telephone manager program 104, then control proceeds to block 345 to ignore the incoming call. If the ignore option has not been selected by the user at decision block 344, then control proceeds to decision block 346.

At decision block 346, if a transfer option has been selected by the user through the user interface of the telephone manager program 104, then control proceeds to block 347. At block 347 the telephone manager program 104 causes the DSP software 120 to answer the incoming call. Thereafter, at block 349 the telephone manager program 104 causes the DSP software 120 to transfer the incoming call.

If the transfer option has not been selected by the user at decision block 346, then control proceeds to block 348 to answer the incoming call. Thereafter at block 350, the telephone manager program 104 causes the telephony application interface 110 to transfer control of the incoming call to the voice interactive application program 100.

Figure 9:
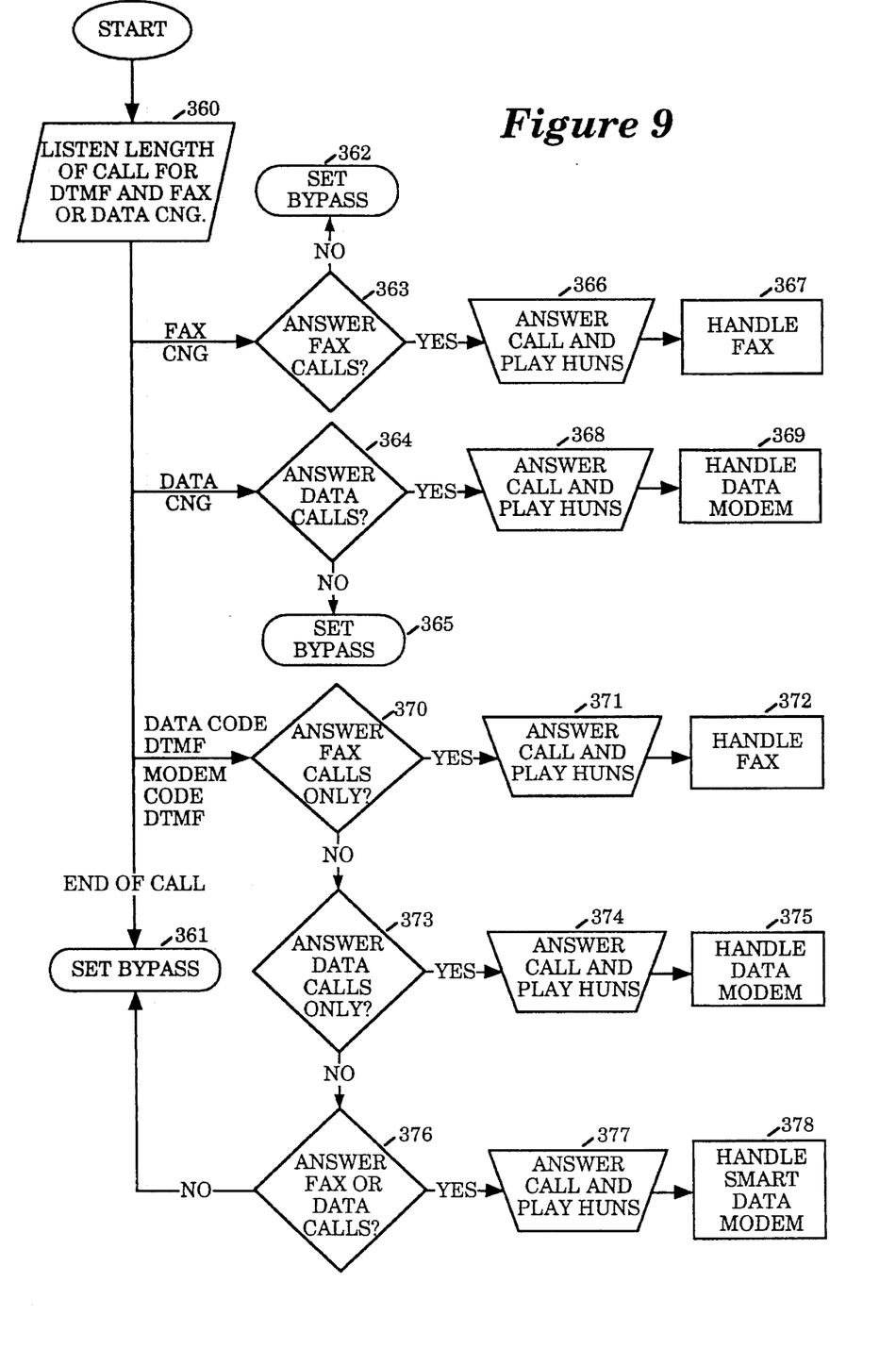
FIG. 9 illustrates the process of the telephone manager program for handling a pick-up of one of the parallel telephones.

FIG. 9 illustrates the process of the telephone manager program 104 for handling a pick-up of one of the parallel telephones 16–17 at block 311. At block 360, the telephone manager program 104 causes the DSP software 120 to listen on the telephone line 22 for DTMF tones, fax calling tones, and data calling tones.

If the telephone manager program 104 receives a message from the DSP software 120 indicating that a fax calling tone is detected, then control proceeds to decision block 363. If the DSP software 120 indicates that a data calling tone is detected, then control proceeds to decision block 364. If the data code DTMF or the modem code DTMF is detected, then control proceeds to decision block 370. If the DSP software 120 detected end of call, then control proceeds to block 361 to bypass the incoming call.

At decision block 363, if the user preferences specify the answer fax calls option, then control proceeds to block 366. At block 366, the telephone manager program 104 causes the DSP software 120 to play the "hang up now" HUNS message over the telephone line 22. Thereafter at block 367, the telephone manager program 104 causes the telephony application interface 110 to transfer control of the incoming call to the fax application program 102 to process the incoming fax call.

At decision block 364, if the user preferences specify the answer data calls option, then control proceeds to block 368. At block 368, the telephone manager program 104 causes the DSP software 120 to answer the incoming call and play the "hang up now" HUNS message over the telephone line 22. Thereafter at block 369, the telephone manager program 104 transfers control of the incoming call to the data modem application program 106.

At decision block 370, if the user preferences specify the answer fax calls only option, then control proceeds to block 371. At block 371, the telephone manager program 104 causes the DSP software 120 to answer the incoming call and play the "hang up now" HUNS message over the telephone line 22. Thereafter at block 372, the telephone manager program 104 transfers control of the incoming call to the fax application program 102.

If the user preferences specify the answer data calls only option at decision block 373, then control proceeds to block 374. At block 374, the telephone manager program 104 causes the DSP software 120 to answer the incoming call and play the "hang up now" HUNS message over the telephone line 22. Thereafter at block 375, the telephone manager program 104 transfers control of the incoming call to the data modem application program 106.

At decision block 376, if the user preferences specify the answer fax or data calls option, then control proceeds to block 377. At block 377, the telephone manager program 104 causes the DSP software 120 to answer the incoming call and play the "hang up now" HUNS message over the telephone line 22. Thereafter at block 378, the telephone manager program 104 transfers control of the incoming call to the smart data modem application program 114.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method of telephone line sharing in a computer system, comprising the steps of:

monitoring a telephone line for an indication of a media mode for an incoming call on the telephone line;

if the indication of the media mode is detected, then passing the incoming call to a telephony application program that corresponds to the media mode and that executes on the computer system;

if the indication of the media mode is not detected, then determining a user option for handling the incoming call including determining whether a ring stop has occurred, and if occurred due to a parallel telephone pick-up, then monitoring the telephone line for the length of the incoming telephone call for a tone indicating that a telephony application is to be initiated.

2. The method of claim 1, wherein the step of monitoring the telephone line for an indication of a media mode for the incoming call comprises the step of monitoring the telephone line for a fax calling tone or a modem calling tone.

3. The method of claim 2, wherein the step of passing the incoming call to a telephony application program that corresponds to the media mode comprises the step of passing the incoming call to a fax application program if the fax calling tone is detected and passing the incoming call to a modem application program if the modem calling tone is detected.

4. The method of claim 1, wherein the step of monitoring the telephone line for an indication of a media mode for the incoming call comprises the step of monitoring the telephone line for a caller ID.

5. The method of claim 4, wherein the step of passing the incoming call to a telephony application program that corresponds to the media mode comprises the step of passing the incoming call to an application program that corresponds to the caller ID.

6. The method of claim 1, wherein the step of monitoring the telephone line for an indication of a media mode for the incoming call comprises the step of monitoring the telephone line for a dual tone multi-frequency (DTMF) tone.

7. The method of claim 6, wherein the step of passing the incoming call to a telephony application program that corresponds to the media mode comprises the step of passing the incoming call to an application program that corresponds to the DTMF tone.

8. The method of claim 1, wherein the step of monitoring the telephone line for an indication of a media mode for the incoming call comprises the step of monitoring the telephone line for a distinctive ring cadence.

9. The method of claim 8, wherein the step of passing the incoming call to a telephony application program that corresponds to the media mode comprises the step of passing the incoming call to an application program that corresponds to the distinctive ring cadence.

10. The method of claim 1, wherein the step of determining a user option for handling the incoming call comprises the steps of:
    determining whether a ring stop has occurred on the telephone line;
    if the ring stop has occurred due to a parallel telephone pick-up, then sensing at least one control tone on the telephone line and passing the incoming call to an application program according to the control tone and a set of user preferences.

11. The method of claim 10, wherein the step of passing the incoming call to an application program according to the control tone and a set of user preferences comprises the steps of playing a hang up now message over the telephone line and passing the incoming call to a fax application program if the control tone is a fax calling tone, and if an option to answer fax calls is specified by the user preferences.

12. The method of claim 10, wherein the step of passing the incoming call to an application program according to the control tone and a set of user preferences comprises the steps of playing a hang up now message over the telephone line and passing the incoming call to a data modem application program if the control tone is a data modem calling tone, and if an option to answer data modem calls is specified by the user preferences.

13. The method of claim 10, wherein the step of passing the incoming call to an application program according to the control tone and a set of user preferences comprises the steps of playing a hang up now message over the telephone line and passing the incoming call to a fax application program if the control tone is a data code DTMF or a modem code DTMF, and if an option to answer fax calls only is specified by the user preferences.

14. The method of claim 10, wherein the step of passing the incoming call to an application program according to the control tone and a set of user preferences comprises the steps of playing a hang up now message over the telephone line and passing the incoming call to a data modem application program if the control tone is a data code DTMF or a modem code DTMF, and if an option to answer data calls only is specified by the user preferences.

15. The method of claim 10, wherein the step of passing the incoming call to an application program according to the control tone and a set of user preferences comprises the steps of playing a hang up now message over the telephone line and passing the incoming call to a smart data modem application program if the control tone is a data code DTMF or a modem code DTMF, and if an option to answer fax or data calls is specified by the user preferences, such that the smart data modem application program attempts to process the incoming call as a data modem, and then attempts to process the incoming call as a fax if the data modem attempt fails.

16. The method of claim 1, wherein the step of determining a user option for handling the incoming call comprises the steps of:
    determining whether a ring stop has occurred on the telephone line;
    if the ring stop has occurred due to a serial telephone pick-up, then passing the incoming call to a telephony application program specified by the user option entered through a user interface on the computer system.

17. The method of claim 16, wherein the step of determining whether a ring stop has occurred comprises the step of determining whether a parallel telephone goes to an off-hook state, wherein the off-hook state is indicated by a time out between a pair of sequential rings on the telephone line, or by detection of speech energy on the telephone line, or by detection of a DTMF tone, a fax calling tone, or a data modem calling tone on the telephone line.

18. The method of claim 16, wherein the user option directs the incoming call to an answering machine function of a voice store application program executing on the computer system.

19. The method of claim 16, wherein the user option directs the incoming call to an application program executing on the computer system that enables a user to answer the incoming call through a set of headphones coupled to the computer system.

20. The method of claim 1, wherein the step of determining a user option for handling the incoming call comprises the steps of:
    determining whether a minimum number of rings on the telephone line has occurred, wherein the minimum number of rings is indicated by a set of user preferences;
    if the minimum number of rings has occurred, then passing the incoming call to an application program specified by the user preferences.

21. The method of claim 20, wherein the user preferences specify an answering machine function of a voice store application program executing on the computer system.

22. The method of claim 20, wherein the step of passing the incoming call to an application program specified by the user preferences comprises the step of passing the incoming call to a smart data modem application program that attempts to process the incoming call as a data modem, and then attempts to process the incoming call as a fax if the data modem attempt fails, and then passes the incoming call to a voice store application program if the fax attempt fails if an option to answer voice calls is specified by the user preferences, and if an option to answer data modem calls actively is specified by the user preferences.

23. The method of claim 20, wherein the step of passing the incoming call to an application program specified by the user preferences comprises the step of passing the incoming call to a voice store application program if an option to answer voice calls is specified, and if an option to answer data modem calls actively is not specified by the user preferences.

24. The method of claim 20, wherein the step of passing the incoming call to an application program specified by the user preferences comprises the step of passing the incoming call to a fax application program if an option to answer voice calls is not specified, and if an option to answer fax calls only is specified by the user preferences.

25. The method of claim 20, wherein the step of passing the incoming call to an application program specified by the user preferences comprises the step of passing the incoming call to a fax application program if an option to answer voice calls is not specified, and if an option to answer fax calls only is specified by the user preferences.

26. The method of claim 20, wherein the step of passing the incoming call to an application program specified by the user preferences comprises the step of passing the incoming call to a smart data modem application program that attempts to process the incoming call as a data modem, and then attempts to process the incoming call as a fax if the data modem attempt fails, and then passes the incoming call to a voice store application program if the fax attempt fails if an option to answer voice calls is not specified, and if an option to answer fax calls only is not specified, and if an option to answer fax or data calls is specified by the user preferences.

27. The method of claim 1, further comprising the step of notifying a user through a user interface when a call of unknown media mode is being received over the telephone line.

28. A computer system, comprising:
communication subsystem coupled to a telephone line to monitor the telephone line for an incoming call and an indication of a media mode for the incoming call;
processor that executes a telephony manager program and a set of telephony application programs, wherein the telephony manager program passes the incoming call to a telephony application program that corresponds to the media mode if the indication of the media mode is detected through the communication subsystem, and wherein the telephony manager program notifies a user that the incoming call is received and then determines a user option or preference for handling the incoming call if the indication of the media mode is not detected including determining whether a ring stop has occurred, and if occurred due to a parallel telephone pick-up, then monitoring the telephone line for the length of the incoming telephone call for a tone indicating that a telephony application is to be initiated.

29. The method of claim 28, wherein the communication subsystem monitors the telephone line for the indication of the media mode for the incoming call by monitoring the telephone line for a fax calling tone or a modem calling tone, and wherein the telephony manager program passes the incoming call to a fax application program if the fax calling tone is detected and passes the incoming call to a modem application program if the modem calling tone is detected.

30. The method of claim 28, wherein the communication subsystem monitors the telephone line for the indication of the media mode for the incoming call by monitoring the telephone line for a caller ID, and wherein the telephony manager program passes the incoming call to a telephony application program that corresponds to the caller ID.

31. The method of claim 28, wherein the communication subsystem monitors the telephone line for the indication of the media mode for the incoming call by monitoring the telephone line for a dual tone multi-frequency (DTMF) tone, and wherein the telephony manager program passes the incoming call to a telephony application program that corresponds to the DTMF tone.

32. The method of claim 28, wherein the communication subsystem monitors the telephone line for the indication of the media mode for the incoming call by monitoring the telephone line for a distinctive ring cadence, and wherein the telephony manager program passes the incoming call to a telephony application program that corresponds to the distinctive ring cadence.

* * * * *

UNITED STATES PATENT AND TRADEMARK OFFICE
CERTIFICATE OF CORRECTION

PATENT NO. : 5,471,522
DATED : November 28, 1995
INVENTOR(S) : Sells et al.

It is certified that error appears in the above-identified patent and that said Letters Patent is hereby corrected as shown below:

In column 14 at line 29 following "telephone" and prior to "pick-up" insert --line--

In column 16 at line 16 delete "method" and insert --system--

In column 16 at line 24 delete "method" and insert --system--

In column 16 at line 30 delete "method" and insert --system--

In column 16 at line 37 delete "method" and insert --system--

Signed and Sealed this

Seventeenth Day of February, 1998

*Attest:*

BRUCE LEHMAN

*Attesting Officer*  *Commissioner of Patents and Trademarks*